Patented Sept. 26, 1922.

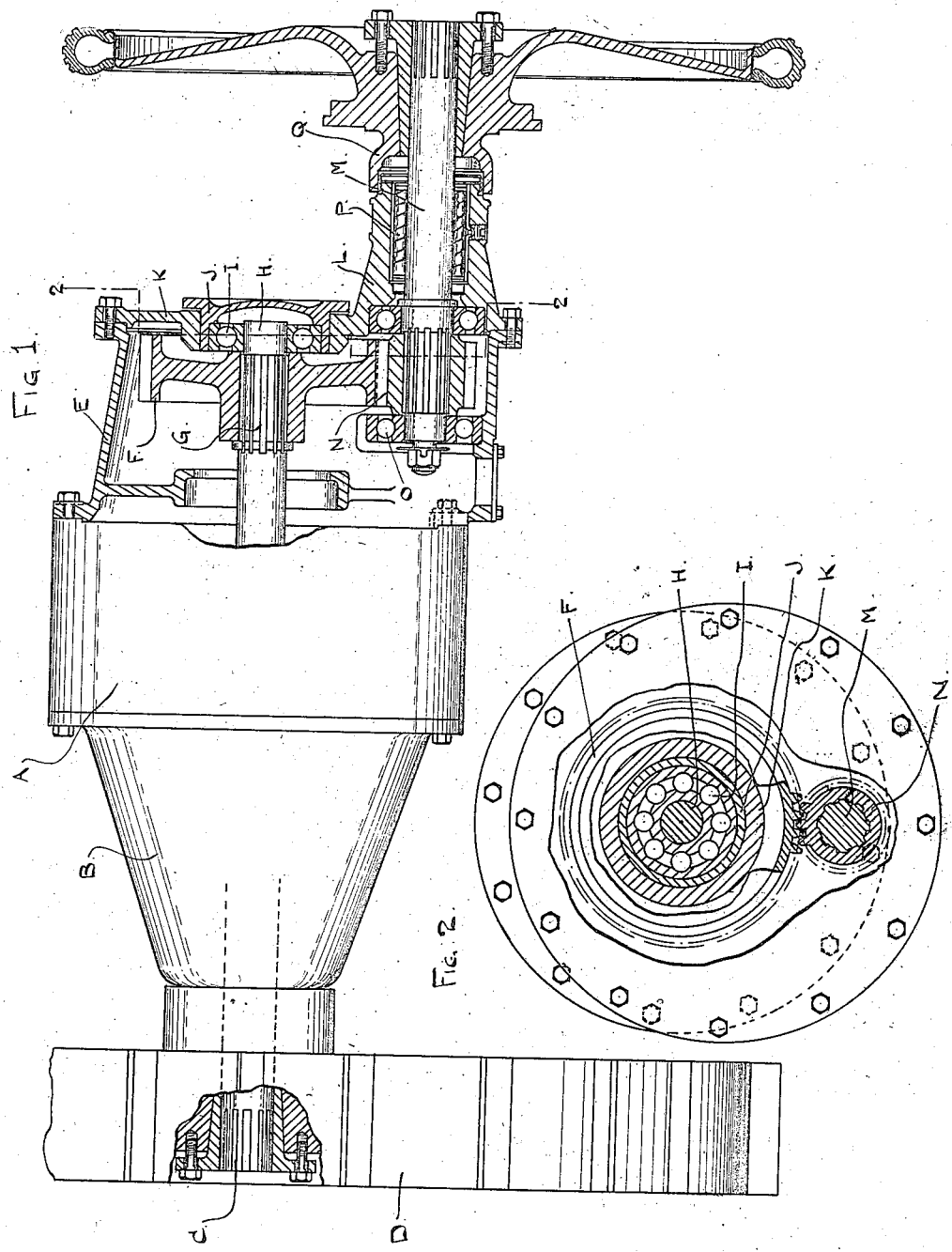

1,429,989

UNITED STATES PATENT OFFICE.

THOMAS C. WHITEHEAD, OF DETROIT, MICHIGAN.

ATTACHMENT FOR TRACTORS.

Application filed March 6, 1922. Serial No. 541,603.

*To all whom it may concern:*

Be it known that I, THOMAS C. WHITEHEAD, a citizen of the United States of America, residing at Detroit, in the county of Wayne and State of Michigan, have invented certain new and useful Improvements in Attachments for Tractors, of which the following is a specification, reference being had therein to the accompanying drawings.

The invention relates to tractors and has for its object the substitution of pneumatic tires for the usual tractor wheels where the tractor is to be used upon smooth pavements. In the present state of the art it is usual to provide tractors with wheels which are larger in diameter than standard pneumatic tires used on motor vehicles. These tractor wheels, where designed for use in connection with agricultural machinery, are usually cleated so as to give additional traction. When, however, the tractor is driven over paved roads, the cleated wheels are injurious to said roads and it is desirable to substitute smooth treads. Also, for such use pneumatic tires are desirable. One difficulty in the way of readily substituting wheels with pneumatic tires for the tractor wheels is the relatively large diameter of the latter, this being greater than in standard sizes of pneumatic tires. If smaller wheels are substituted, this will change the ground clearance of the frame and moreover will proportionately decrease the speed. Instead of thus decreasing the speed, it is highly desirable to increase the speed of the tractor when used on smooth pavements and with pneumatic tires, and it is one of the objects of my invention to accomplish this result. It is a further object, as above stated, to permit of using standard sizes of pneumatic tires instead of special sizes. With these objects in view the invention consists in the construction as hereinafter set forth.

In the drawings:

Figure 1 is a cross-section through the tractor, showing on one side thereof the standard tractor wheel and on opposite side my attachment for use of pneumatically tired wheels;

Figure 2 is a sectional side elevation.

My improvements are applicable to any type of tractor, but are more particularly designed for use with the Fordson. With the standard construction of such tractor, A is the housing for the differential gearing and B is a removable extension of said housing through which passes the driven axle C splined at its outer end to the tractor wheel D. My improvement consists of a substitute housing E for the housing B, which may be attached to the differential housing by the same bolts. This housing E is of sufficient diameter to receive a gear wheel F which is mounted upon the shaft C, the latter being either cut down in length or exchanged for a shorter substitute shaft. The end of the shaft C is splined at G for engagement with the hub of the gear F and outside of the splined portion is provided with a reduced portion H on which is mounted a ball or other anti-friction bearing I. The bearing I also engages a removable cap J, which closes an aperture concentric with the axis of the shaft C in the large cover plate K of the housing E. Upon the lower portion of this cover plate K is the outwardly projecting housing L for an axle shaft M having mounted on its inner end the pinion N in mesh with the gear F. The shaft M is journaled in antifriction bearings O on opposite sides of the pinion and roller bearings P are provided for the outer portion with the shaft within the extension L. Q is a wheel of any suitable construction mounted on the outer end of the shaft M, said wheel being of such a diameter as to receive some standard size of pneumatic tire.

With the construction as described, to exchange the standard tractor wheels for the pneumatically tired wheels, the housings B are removed and also the axle shafts C. These shafts C are either cut down in length and resplined or substitute shafts are used which are splined to receive the wheel F. My substitute unit is then mounted upon the differential housing with the portion L at the bottom and this so lowers the drive shafts M that the smaller diameter wheels may be used. Also, the intermeshing gears F and N will step up the driving speed not only to compensate for the decrease in the diameter of the wheels; but also to relatively increase the speed at which the tractor will be driven. Thus the machine is adapted to be used with the standard sizes of pneumatic tires and can be driven at a higher speed than with the usual tractor wheels.

What I claim as my invention is:

1. The combination with a tractor designed for use of tractor wheels of larger diameter than standard sizes of pneumatic tires, of a substitute unit comprising a replacement housing for the outer portion of the axle housing, a downwardly offset axle in said replacement housing, a step-up gearing between the main axle shaft and said offset axle, and a pneumatically tired wheel of smaller diameter than the original wheel mounted on said offset axle.

2. The combination with a tractor designed for use of tractor wheels of larger diameter than standard sizes of pneumatic tires and having an axle housing including a central portion for the differential gear and removable lateral extension housings, of a substitute unit comprising a replacement for the lateral extension of the axle housing, an axle shaft of lesser length than the original axle shaft within said replacement housing, a gear wheel on said axle shaft, a downwardly offset axle shaft in said replacement housing, intermeshing gears constituting a step-up train between said axle shaft and offset axle shaft, and a wheel of smaller diameter than the original wheel mounted on said offset axle shaft and adapted to receive a standard size of pneumatic tire.

3. The combination with a tractor designed for use on tractor wheels of larger diameter than standard sizes of pneumatic tires and provided with an axle housing having a central portion for the differential gearing and removable lateral extensions for the axle shaft, of a replacement unit comprising a housing adapted to be substituted for said extension housing and to be secured by the same bolts to the housing for said differential gearing, said substitute housing having a portion of lesser length than the original housing concentric with the axle and a portion downwardly offset extending outward, a shaft shorter than the original axle shaft within the concentric portion of said housing, a gear wheel mounted on said shaft, a shaft in the downwardly offset portion of said housing, a pinion on said shaft in mesh with said gear wheel, and a tractor wheel mounted on the outer end of the latter shaft and of a diameter suitable for receiving a standard size of pneumatic tire.

4. The combination with a tractor designed for use of relatively large diameter tractor wheels, of a substitute unit comprising a replacement housing for the outer portion of the axle housing, a downwardly offset axle in said replacement housing, a step-up gearing between the main axle shaft and said offset axle, and a wheel of smaller diameter than the original wheel mounted on said offset axle.

In testimony whereof I affix my signature.

THOMAS C. WHITEHEAD.